(12) United States Patent
Hioki et al.

(10) Patent No.: US 10,688,964 B2
(45) Date of Patent: Jun. 23, 2020

(54) VEHICLE MANAGEMENT SYSTEM, VEHICLE MANAGEMENT METHOD, AND NON-TRANSITORY COMPUTER-READABLE RECORDING MEDIUM

(71) Applicant: TOYOTA JIDOSHA KABUSHIKI KAISHA, Toyota-shi (JP)

(72) Inventors: Jun Hioki, Nagakute (JP); Hiroshi Igata, Yokohama (JP); Megumi Amano, Toyota (JP); Masaki Ito, Toyota (JP); Tomoaki Miyazawa, Nagoya (JP); Yuichiro Haruna, Oyama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/211,297

(22) Filed: Dec. 6, 2018

(65) Prior Publication Data
US 2019/0184938 A1      Jun. 20, 2019

(30) Foreign Application Priority Data

Dec. 20, 2017   (JP) ................................ 2017-243747

(51) Int. Cl.
| | |
|---|---|
| *B60R 1/12* | (2006.01) |
| *B60R 1/00* | (2006.01) |
| *B60Q 9/00* | (2006.01) |
| *B60R 25/24* | (2013.01) |
| *G05D 1/00* | (2006.01) |
| *G08G 1/00* | (2006.01) |
| *G06Q 30/04* | (2012.01) |
| *B60L 53/00* | (2019.01) |

(52) U.S. Cl.
CPC ................ *B60R 25/24* (2013.01); *B60Q 9/00* (2013.01); *G05D 1/0088* (2013.01); *G06Q 30/04* (2013.01); *G08G 1/205* (2013.01); *B60L 53/00* (2019.02); *B60R 2325/101* (2013.01); *B60R 2325/103* (2013.01); *B60R 2325/205* (2013.01); *G05D 2201/0213* (2013.01)

(58) Field of Classification Search
CPC ...................................................... B60R 25/24
See application file for complete search history.

(56) References Cited

U.S. PATENT DOCUMENTS

| | | | |
|---|---|---|---|
| 2008/0086509 A1* | 4/2008 | Wallace | G06F 16/285 |
| 2010/0036600 A1* | 2/2010 | Shinmyoh | G01C 21/265 |
| | | | 701/532 |

(Continued)

FOREIGN PATENT DOCUMENTS

JP      2014-169059      9/2014

*Primary Examiner* — Joseph H Feild
*Assistant Examiner* — Pameshanand Mahase
(74) *Attorney, Agent, or Firm* — Oblon, McClelland, Maier & Neustadt, L.L.P.

(57) ABSTRACT

A vehicle management system includes a server. The server is configured to acquire range information representing an available range of a vehicle, acquire positional information of the vehicle, determine whether or not a position of the vehicle is out of the available range or is expected to deviate from the available range, and provide a notification to a device related to the vehicle in a case where the position of the vehicle is out of the available range or in a case where the position of the vehicle is expected to deviate from the available range.

12 Claims, 7 Drawing Sheets

(56) References Cited

U.S. PATENT DOCUMENTS

| | | | |
|---|---|---|---|
| 2015/0006005 A1* | 1/2015 | Yu | G06Q 10/08 |
| | | | 701/22 |
| 2015/0133164 A1* | 5/2015 | Song | G06Q 10/10 |
| | | | 455/456.3 |
| 2017/0123421 A1* | 5/2017 | Kentley | G01S 17/87 |
| 2019/0072964 A1* | 3/2019 | Nix | G05D 1/0088 |
| 2019/0120640 A1* | 4/2019 | Ho | G01C 21/3453 |

* cited by examiner

FIG. 7

VEHICLE MANAGEMENT SYSTEM, VEHICLE MANAGEMENT METHOD, AND NON-TRANSITORY COMPUTER-READABLE RECORDING MEDIUM

INCORPORATION BY REFERENCE

The disclosure of Japanese Patent Application No. 2017-243747 filed on Dec. 20, 2017 including the specification, drawings and abstract is incorporated herein by reference in its entirety.

BACKGROUND

1. Technical Field

The present disclosure relates to a vehicle management system, a vehicle management method, and a non-transitory computer-readable recording medium storing a program for executing a vehicle management method with a computer.

2. Description of Related Art

A technique with which a portable terminal such as a smartphone can be used as a vehicle key is known. By means of the above technique, a vehicle can be lent even without a vehicle key being directly handed, and thus the technique can be suitably used for a car sharing service and a car rental service. Here, Japanese Unexamined Patent Application Publication No. 2014-169059 (JP 2014-169059 A) discloses limiting the available range of a lent vehicle by setting an available range in an electronic key.

SUMMARY

According to JP 2014-169059 A, the range in which the electronic key can be used can be limited. After the engine of the vehicle is started with the electronic key, however, the vehicle can be driven even without the electronic key and a user can drive the vehicle out of the available range in the electronic key. In other words, the range of use of the vehicle cannot be limited by the method described in JP 2014-169059 A.

The present disclosure provides a vehicle management system with which a vehicle can be used within a limited range, a vehicle management method, and a non-transitory computer-readable recording medium storing a program for executing a vehicle management method with a computer.

A first aspect of the present disclosure relates to a vehicle management system including a server. The server is configured to acquire range information representing an available range of a vehicle, acquire positional information of the vehicle, determine whether or not a position of the vehicle is out of the available range or is expected to deviate from the available range, and provide a notification to a device related to the vehicle in a case where the position of the vehicle is out of the available range or in a case where the position of the vehicle is expected to deviate from the available range.

The available range that the server acquires may be determined as a geographical region or a region in which a user can arrive at a destination by a destination arrival time. The positional information that the server acquires may be acquired from the vehicle or a device other than the vehicle insofar as the position of the vehicle can be grasped with the positional information.

In the vehicle management system according to the first aspect of the present disclosure, the server may be configured to issue electronic key data of the vehicle with respect to a user device. In this case, the server may be configured to make the determination when the vehicle is used by using the electronic key data. The use of the vehicle by means of the electronic key data can be grasped by the vehicle management system by, for example, reception of a notification from the user device or reception of a notification from the vehicle.

In the vehicle management system according to the first aspect of the present disclosure, the server may be configured to acquire the range information as a condition for issuing the electronic key data to the user device. In this case, the server may be configured to use, for the determination, the available range represented by the range information related to the user device.

In the vehicle management system according to the first aspect of the present disclosure, the device related to the vehicle may be any of a device mounted in the vehicle and the user device functioning as an electronic key of the vehicle. In other words, the server may be configured to provide the notification to an in-vehicle terminal mounted in the vehicle or configured to provide the notification to the user device. Specific methods are not particularly limited insofar as the notification is provided to a user using the user device.

In the vehicle management system according to the first aspect of the present disclosure, the content of the notification provided by the server is not particularly limited. For example, the notification may be a warning regarding the vehicle being out of the available range or being expected to deviate from the available range, a notification for informing of charging to be performed or a post-charging report, or a notification regarding a notification for an autonomous driving-based vehicle movement or a report following a movement request. In the case of the autonomous driving-based vehicle movement, the vehicle may be an autonomously drivable vehicle. The server may be configured to provide a notification for requesting a control device of the vehicle to move up to a predetermined position by autonomous driving.

In the vehicle management system according to the first aspect of the present disclosure, the server may be configured to change the available range with time for use in the determination. In the vehicle management system according to the first aspect of the present disclosure, the range information may further include a destination and time of arrival at the destination. The server may be configured to change the available range as a range in which the vehicle is arrivable at the destination by the time of arrival. At this time, the server may use a real-time traffic situation (such as an average movement speed) or a statistical traffic situation.

A second aspect of the present disclosure relates to a vehicle management method performed by a vehicle management system including a server. The vehicle management method includes acquiring, by the server, range information representing an available range of a vehicle, acquiring, by the server, positional information of the vehicle, determining, by the server, whether or not a position of the vehicle is out of the available range or is expected to deviate from the available range, and providing, by the server, a notification to a device related to the vehicle in a case where the position of the vehicle is out of the available range or in a case where the position of the vehicle is expected to deviate from the available range.

A third aspect of the present disclosure relates to a non-transitory computer-readable recording medium storing a program for executing a vehicle management method performed by a vehicle management system with a computer. The vehicle management system includes a server. The program executes a control process for the vehicle management system. The control process includes acquiring, by the server, range information representing an available range of a vehicle, acquiring, by the server, positional information of the vehicle, determining, by the server, whether or not a position of the vehicle is out of the available range or is expected to deviate from the available range, and providing, by the server, a notification to a device related to the vehicle in a case where the position of the vehicle is out of the available range or in a case where the position of the vehicle is expected to deviate from the available range.

The aspects of the present disclosure can be identified as a vehicle management device including at least a part of the server. The aspects of the present disclosure can be identified as a vehicle lending system including a vehicle, a user device, and the vehicle management device. The aspects of the present disclosure can be identified as a vehicle management method performed by the above-described vehicle management system and a non-transitory computer-readable recording medium storing a program for executing the vehicle management method with a computer. The above-described processing and server can be freely combined and implemented insofar as the combination and implementation result in no technical contradiction.

According to the aspects of the present disclosure, a vehicle can be used within a limited range.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

The present disclosure relates to a vehicle management system issuing an electronic key (electronic key) with respect to a portable terminal such as a smartphone, a vehicle management method, and a non-transitory computer-readable recording medium storing a program for executing a vehicle management method with a computer. The present disclosure can be desirably applied to a service for lending a vehicle in exchange for consideration such as car rental and car sharing.

First Embodiment

A first embodiment of the present disclosure relates to a vehicle lending system using a vehicle management system. The vehicle lending system according to the first embodiment restrains a lent vehicle from being used outside a predetermined available range.

System Overview

Figure 1:
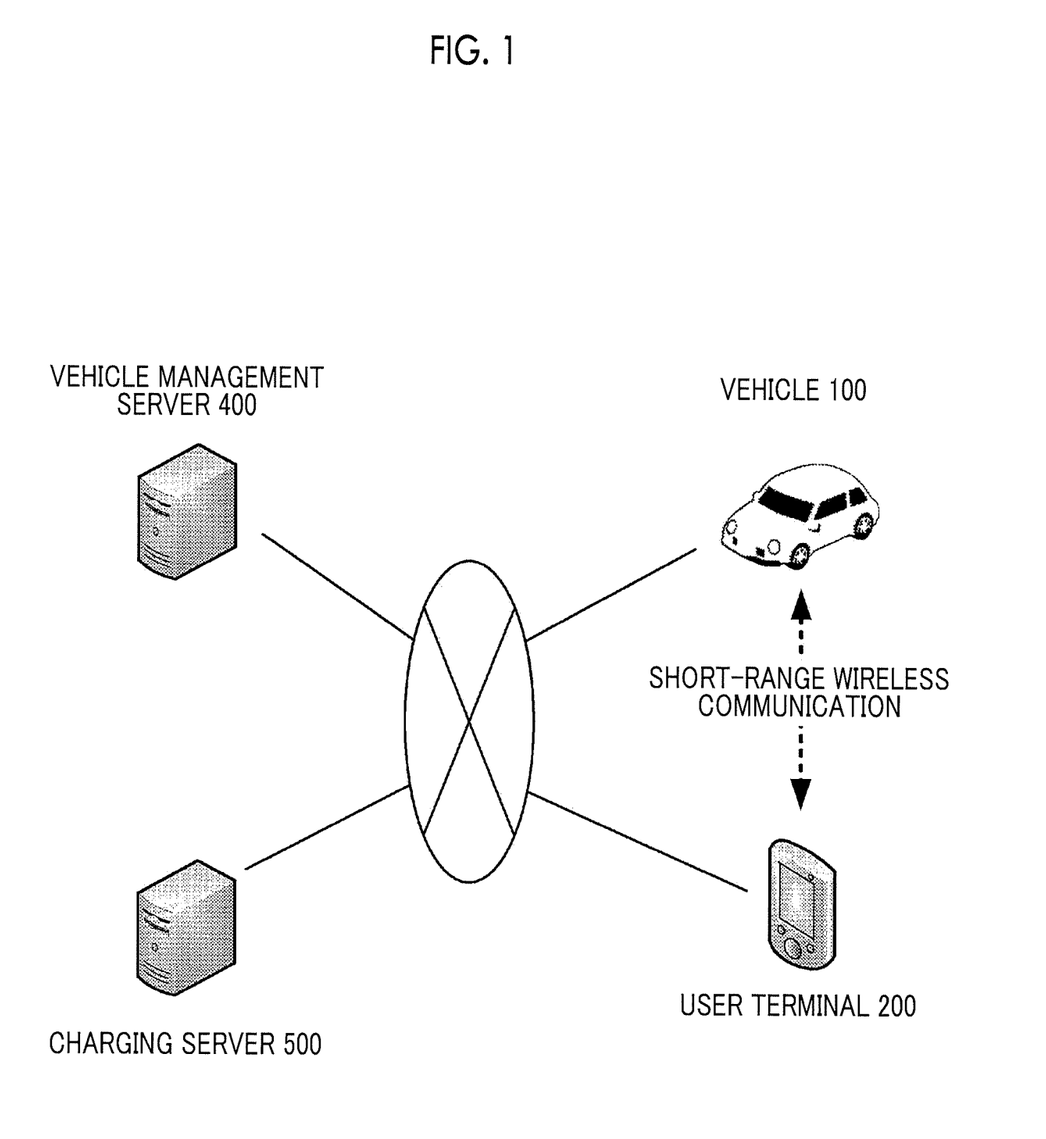
FIG. 1 is a system overview of a vehicle lending system according to an embodiment.

FIG. 1 is a diagram illustrating a system overview of the vehicle lending system according to the first embodiment. The vehicle lending system according to the first embodiment is configured to include a vehicle 100, a user terminal 200, a vehicle management server 400, and a charging server 500.

Figure 2:
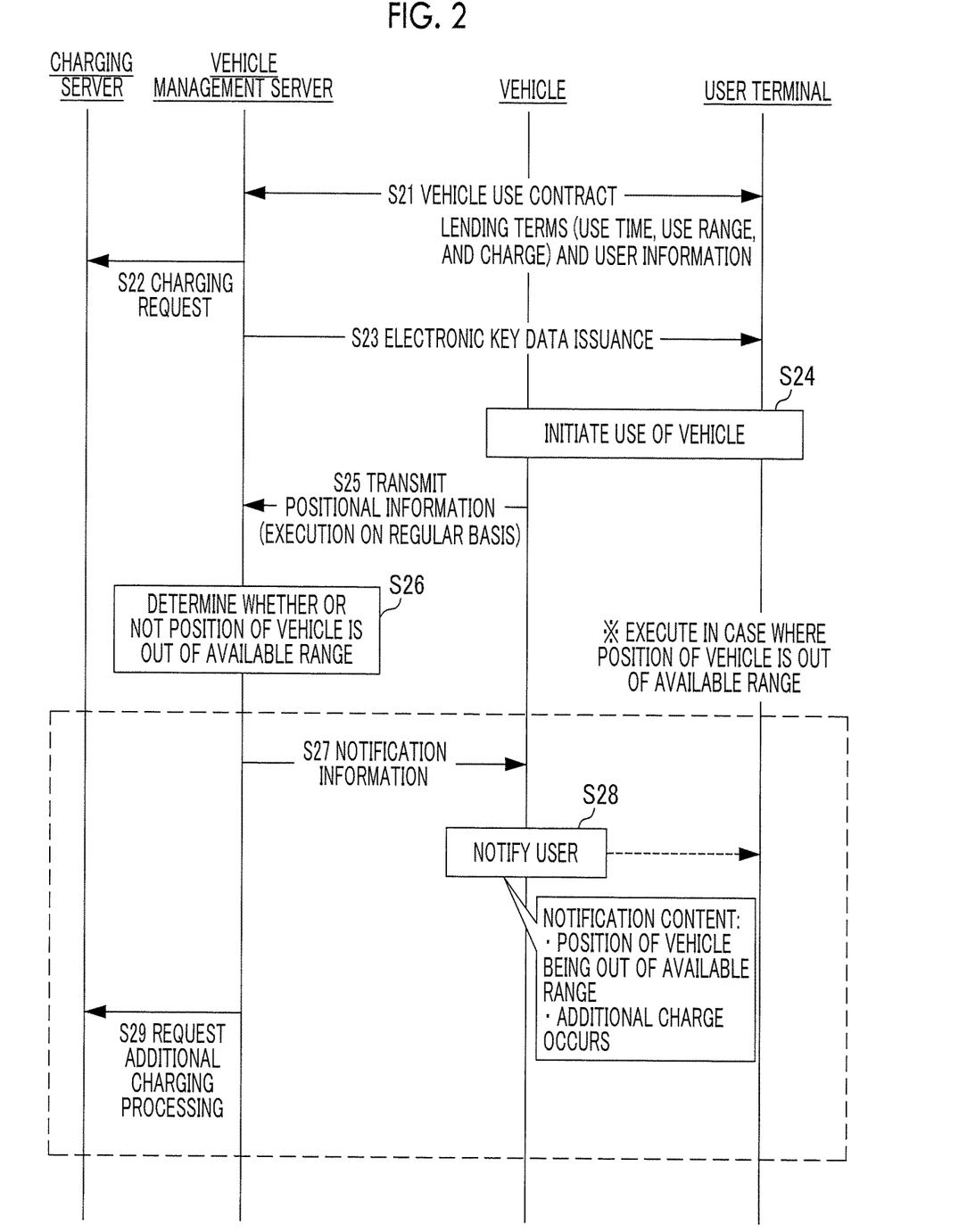
FIG. 2 is a diagram for describing an overall processing flow regarding the vehicle lending system according to the embodiment.

FIG. 2 is a diagram for describing an overall processing flow according to the first embodiment. First, in Step S21, a user accesses the vehicle management server 400 by using the user terminal 200 and concludes a use contract (lending contract) for the vehicle 100. The use contract includes, for example, terms of use (lending terms) such as use time, range, and charge and user information such as the user's name and address and payment information. In the first embodiment, how the terms of use are determined is not particularly limited.

In Step S22, the vehicle management server 400 performs, with respect to the charging server 500, a request for charging processing with respect to the user based on the use contract. The charging server 500 executes the charging processing with respect to the user based on the request.

Once payment by the user is completed, the vehicle management server 400 issues electronic key data with respect to the user terminal 200 in Step S23. In Step S24, the user starts using the vehicle by starting the engine of the vehicle 100 with the electronic key of the user terminal 200.

In Step S25, the vehicle 100 transmits positional information to the vehicle management server. The positional information transmission is repeatedly executed on a regular basis during the use of the vehicle 100 by the user. In Step S26, the vehicle management server 400 determines, based on the positional information transmitted from the vehicle 100, whether or not the position of the vehicle 100 is out of the available range (or whether or not the position of the vehicle 100 is expected to deviate from the available range).

The processing of Steps S27 to S29, which is surrounded by a dotted line, is executed in a case where the position of the vehicle 100 is out of (or expected to deviate from) the available range. In Step S27, notification information is transmitted with respect to the vehicle 100 from the vehicle management server 400. The notification information includes, for example, that the vehicle 100 is out of the available range or that additional charging occurs. In Step S28, the vehicle 100 notifies the user of the notification received from the vehicle management server 400 via a display or a speaker. In a case where the vehicle 100 remains out of the available range even after the notification, the vehicle management server 400 performs a request for additional charging processing with respect to the charging server 500 in Step S29.

As described above, the vehicle management server 400 notifies the user of the vehicle 100 being out of the available range or the additional charging being performed, and thus the user is expected to try to return the vehicle 100 to the available range. In other words, according to the first embodiment, it is possible to promote use conforming to the terms of use (lending terms).

Although the vehicle management server 400 provides (transmits) the notification information with respect to the vehicle 100 in Step S27, notification information transmission with respect to the user terminal 200 and a notification with respect to the user from the user terminal 200 are also possible. Although the additional charging is performed after use outside the available range continues for a predetermined time here, the additional charging may also be performed as soon as the vehicle 100 moves out of the available range.

Functional Configuration

Figure 3:
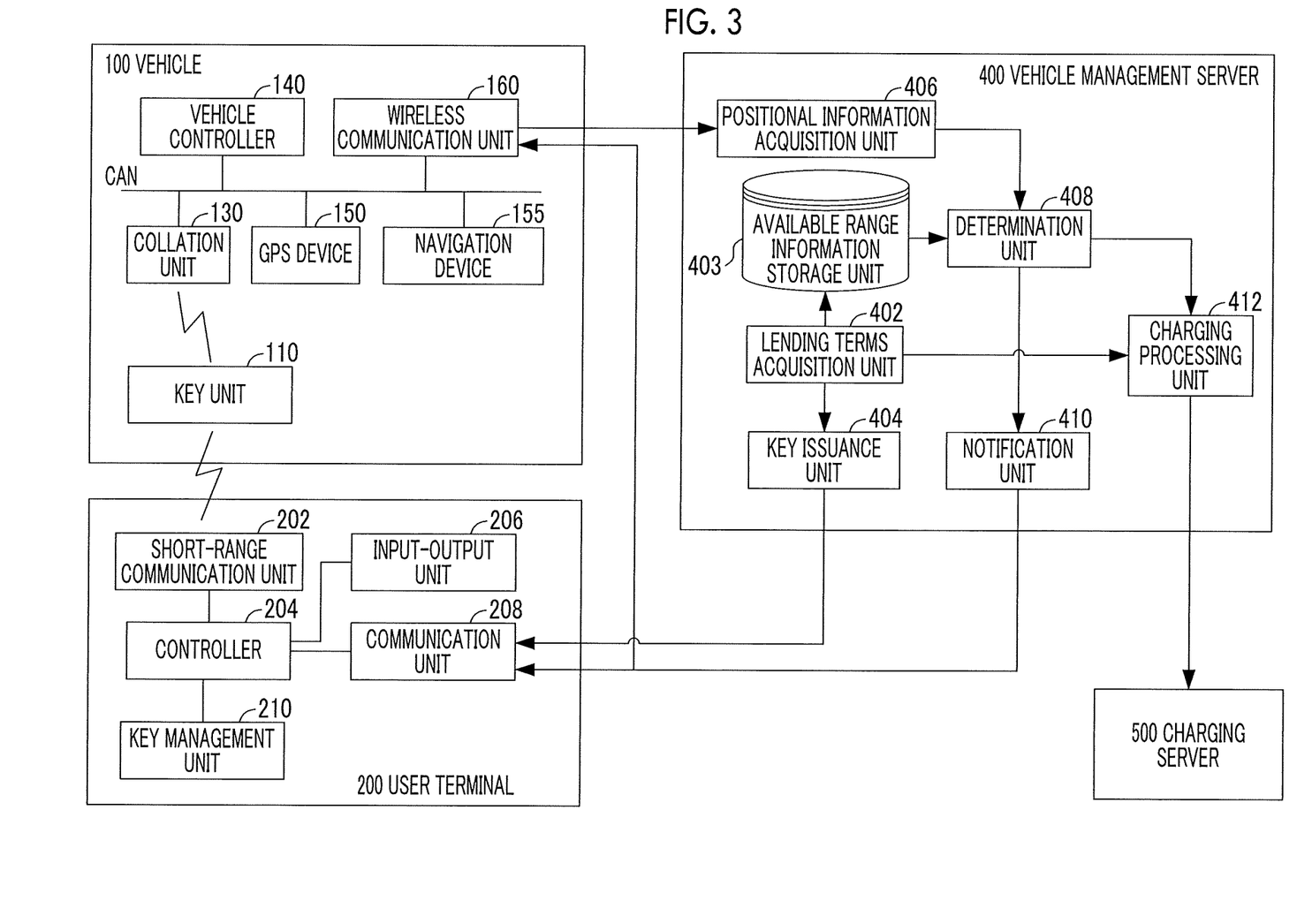
FIG. 3 is a block diagram schematically illustrating an example of components of the vehicle lending system.

FIG. 3 is a functional block diagram of each device constituting the vehicle lending system according to the first embodiment.

Vehicle 100

The vehicle 100 is provided with a key unit 110, a collation unit 130, a vehicle controller 140, a GPS device 150, a navigation device 155, and a wireless communication unit 160. The collation unit 130, the vehicle controller 140, the GPS device 150, the navigation device 155, and the wireless communication unit 160 are connected in a wired manner by a vehicle network such as a controller area network (CAN). The key unit 110 is connected to the collation unit 130 by wireless communication.

The key unit 110 has a wireless interface similar to that of a smart key (portable device of a smart entry system). By the key unit 110 performing communication with the collation unit 130, the vehicle can be locked and unlocked and other vehicle operations can be performed without a physical key being used. The key unit 110 performs short-range wireless communication with the user terminal 200 and determines whether or not the key unit 110 plays a role as a key (vehicle operation device) of the vehicle 100 based on the result of authentication of the user terminal 200. In other words, a system user can perform vehicle locking and unlocking and other vehicle operations by operating the user terminal 200 from the outside of the vehicle 100.

The key unit 110 performs short-range wireless communication with the user terminal 200 by using the Bluetooth (registered trademark) Low Energy standard (hereinafter, referred to as "BLE"). Also usable are wireless communication standards such as Near Field Communication (NFC), Ultra Wide Band (UWB), and WiFi (registered trademark). The key unit 110 receives the electronic key data from the user terminal 200. When this authentication is successful, the key unit 110 transmits a key ID to the collation unit 130. It is assumed that the key ID is stored in the key unit 110 as unique authentication information and registration processing to the collation unit 130 is performed in advance.

The collation unit 130 is connected to the key unit 110 by wireless communication. Although the standard of the wireless communication is not particularly limited, in the first embodiment, the communication from the collation unit 130 to the key unit 110 is performed by means of radio waves in the Low Frequency (LF) band and the communication from the key unit 110 to the collation unit 130 is performed by means of radio waves in the Radio Frequency (RF) band. The collation unit 130 transmits an LF band polling signal on a regular basis. The key unit 110 transmits the key ID in response to the polling signal. The collation unit 130 determines whether or not the received key ID matches a registered key ID. When the received key ID matches the registered key ID, the collation unit 130 is capable of causing the vehicle to perform a predetermined operation by notifying the vehicle controller 140 of the matching.

The vehicle controller 140 is a functional unit controlling the vehicle 100. The control of the vehicle 100 includes engine ON and OFF, door locking and unlocking, and door opening and closing, yet is not limited thereto.

The global positioning system (GPS) device 150 acquires positional information in which a GPS satellite signal is received. Insofar as the positional information can be acquired, the vehicle 100 may use a positioning device based on a global navigation satellite system (GNSS) other than a GPS or may use a positioning device based on base station positioning.

The navigation device 155 performs search for a path to a destination, path display, and so on. The navigation device 155 has a display and a speaker and is configured to be capable of performing a notification with respect to a user.

The wireless communication unit 160 is a communication unit for connecting the vehicle 100 to a network. In the first embodiment, the wireless communication unit 160 is capable of communicating with another device (such as the vehicle management server 400) via a network by using a mobile communication service such as The Third Generation (3G) and Long Term Evolution (LTE).

The vehicle 100 transmits the positional information acquired by the GPS device 150 to the vehicle management server 400 via the wireless communication unit 160. The acquisition and transmission of the positional information are repeatedly executed at predetermined intervals. In addition to the positional information, the vehicle 100 may also transmit, to the vehicle management server 400, information acquired from an accelerator sensor, a steering angle sensor, an orientation sensor, an engine control device, a light control device, a wiper control device, and so on. The vehicle 100 may transmit, to the vehicle management server 400, information identifying the electronic key used for the vehicle 100 to be used.

User Terminal 200

The user terminal 200 will be described below. The user terminal 200 is a device used by a user. Accordingly, the user terminal 200 can also be referred to as a user device in this specification.

The user terminal 200 is, for example, a small computer such as a smartphone, a mobile phone, a tablet terminal, a personal information terminal, and a wearable computer (such as a smart watch). The user terminal 200 is configured to have a short-range communication unit 202, a controller 204, an input-output unit 206, a communication unit 208, and a key management unit 210.

The short-range communication unit 202 is means for performing short-range wireless communication with the key unit 110. As described above, BLE communication is used in the first embodiment. The controller 204, which is a microprocessor, controls the entire device by executing a program stored in a memory. The input-output unit 206, which is a touch screen, outputs an image and receives touch input from a user. The communication unit 208 is a communication unit for connecting the user terminal 200 to a network and uses a mobile communication service such as 3G and LTE. The key management unit 210 stores the electronic key data issued from the vehicle management server.

A user who uses the user terminal 200 receives the electronic key data of the vehicle 100 from the vehicle management server 400 by operating the input-output unit 206. The electronic key data transmitted from the vehicle management server 400 is stored in the key management unit 210. When the user using the user terminal 200 uses the vehicle 100, the electronic key data is transmitted to the key unit 110 of the vehicle 100 by the user performing a predetermined input operation in the vicinity of the vehicle 100 (within the communication range of the short-range wireless communication). As a result, the user can use the vehicle 100.

When the use of the vehicle 100 is initiated by means of the electronic key data, the user terminal 200 may inform the vehicle management server 400 of the initiation of the use of the vehicle 100 by wireless communication. During the use of the vehicle 100, the user terminal 200 may transmit positional information obtained from a GPS device (not illustrated) of the user terminal 200 to the vehicle management server 400 on a regular basis.

Vehicle Management Server 400

The vehicle management server (key management device) 400 will be described below. The vehicle management server 400 is a computer that has a microprocessor, a storage device, an input-output device, and a communication device. The following functions are realized by the microprocessor executing a program. Some or all of the functions may be realized by a hardware circuit such as an application specific integrated circuit (ASIC) and a field programmable gate array (FPGA). The vehicle management server 400 does not have to be realized by one computer. The vehicle management server 400 may be realized by a plurality of cooperating computers.

The vehicle management server 400 is provided with a lending terms acquisition unit 402, an available range information storage unit 403, a key issuance unit 404, a positional information acquisition unit 406, a determination unit 408, a notification unit 410, and a charging processing unit 412.

The lending terms acquisition unit 402 acquires lending terms at a time when the vehicle 100 is lent to a user. The lending terms include the available range of the vehicle 100. The available range may be determined as a geographical region. For example, the available range may be determined as a region within a predetermined distance from a predetermined point or may be determined as a rectangular region around a predetermined point. The lending terms acquisition unit 402 is capable of, for example, acquiring the lending terms as a part of the use contract from the user terminal 200. In a case where the user concludes a use contract by using a reservation server other than the vehicle management server 400, the lending terms acquisition unit 402 may acquire the lending terms from the reservation server. The lending terms acquisition unit 402 stores the acquired available range in the available range information storage unit 403 in association with the user or the user terminal 200. The available range may be determined in advance. In that case, the available range may not be acquired from an external device.

The key issuance unit 404 is a functional unit that issues the electronic key data of the vehicle 100 with respect to the user device based on an electronic key issuance request from the user device. The key issuance unit 404 issues the electronic key data with respect to the user terminal 200 of a user who concluded a use contract for the vehicle 100. The electronic key issuance does not have to immediately follow the use contract. The electronic key issuance may be performed at any timing preceding use initiation.

In the first embodiment, the electronic key means electronic data allowing the vehicle 100 to be controlled by means of the user device insofar the electronic key is possessed by the user device. Still, the electronic key can be invalidated as will be described later, and the vehicle 100 cannot be controlled with an invalidated electronic key. Since the electronic key is electronic data, the electronic key is also referred to as electronic key data and the two terms are interchangeably used in this specification.

The key issuance unit 404 issues the electronic key to the user device after setting an electronic key expiration date. The expiration date is set in advance during, for example, registration. The electronic key may include a valid/invalid flag indicating whether the electronic key is valid or invalid.

The positional information acquisition unit 406 acquires the positional information of the vehicle 100 from the vehicle 100 by wireless communication. The positional information acquisition unit 406 may be configured to retain the positional information acquired within the most recent predetermined period in a storage device (not illustrated).

The positional information acquisition unit 406 may acquire the positional information of the user terminal 200 instead of the positional information of the vehicle 100 and regard the positional information of the user terminal 200 as the positional information of the vehicle 100. This is because the positional information of the user terminal 200 can be identified with the positional information of the vehicle 100 in a case where the vehicle 100 is used with the user terminal 200 used as a key.

The determination unit 408 determines whether or not the position of the vehicle 100 is out of the available range based on the positional information acquired from the vehicle 100 and the available range stored in the available range information storage unit 403. The determination unit 408 may determine whether or not the vehicle 100 is expected to deviate from the available range in the future instead of determining whether or not the vehicle 100 is currently out of the available range. A future position of the vehicle may be estimated by extrapolation based on the history of the position of the vehicle 100 or may be estimated based on a planned traveling path acquired from the vehicle 100 and, for example, the current position, the traveling direction, and the traveling speed of the vehicle 100.

The notification unit 410 provides (transmits) notification information to at least one of an in-vehicle terminal of the vehicle 100 and the user terminal 200. The timing of the notification and the content of the notification will be described later.

The charging processing unit 412 requests the charging server 500 to perform charging processing on a user. The charging processing unit 412 makes the charging processing request at a point in time when a contract with the user is concluded and makes the charging processing request also in a case where the user uses the vehicle 100 outside the available range. As described above, the charging processing may be performed immediately after the user uses the vehicle 100 outside the available range or the charging processing may be performed in a case where the user ignores a warning initially given to the user and continues to use the vehicle 100 outside the available range.

Charging Server 500

The charging server 500 will be described below. The hardware configuration of the charging server 500 is similar to that of the vehicle management server 400, and thus repetitive description will be omitted. The charging server 500 and the vehicle management server 400 may be realized by the same computer.

The charging server 500 acquires a charge amount and a billing target person from the vehicle management server 400 and stores the charge amount and the billing target person. The charging server 500 may electronically transmit a bill to a user.

Processing

Vehicle Lending Processing

Figure 4:
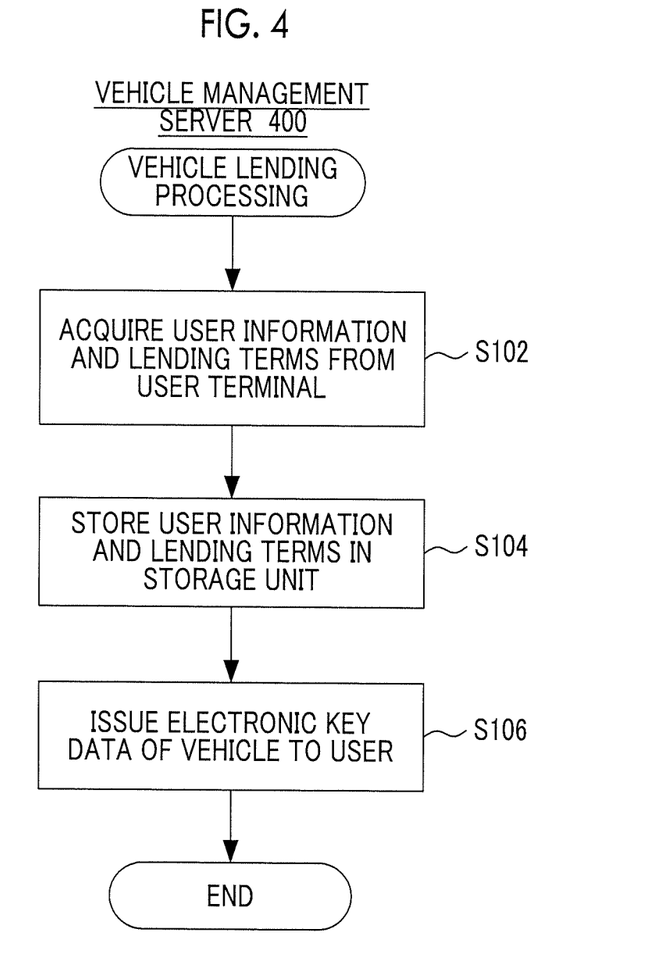
FIG. 4 is a flowchart illustrating a processing flow at a time when an electronic key of a vehicle according to the embodiment is issued.

Processing for issuing the electronic key of the vehicle 100 with respect to the user terminal 200, that is, processing for lending the vehicle 100 will be described with reference to FIG. 4. Each processing illustrated in FIG. 4 is executed by the vehicle management server 400.

In Step S102, the lending terms acquisition unit 402 acquires, from the user terminal 200, the user information of a user who uses the vehicle 100 and the lending terms at the time of the use of the vehicle 100. The vehicle management server 400 may acquire the content of the use contract at the time when the user uses the vehicle 100 and the lending terms acquisition unit 402 may extract the lending terms and the user information included in the use contract. The lending terms include the time during which the vehicle 100 can be used, the range in which the vehicle 100 can be used, and the charge to be paid as consideration. The user information includes the user's name and address, payment information, and so on.

In Step S104, the lending terms acquisition unit 402 stores the available range information acquired in Step S102 in the available range information storage unit 403. The other information acquired in Step S102 is stored in the storage unit as well.

In Step S106, the key issuance unit 404 issues the electronic key data with respect to the user terminal 200. Although an example in which the terminal used for the use contract and the terminal of the electronic key data issuance destination are the same is used for description here, the terminal used for the use contract and the terminal of the electronic key data issuance destination may be different as well.

Vehicle Monitoring Processing

Monitoring processing for the vehicle 100 that is executed by the vehicle management server 400 during the use of the vehicle 100 by the user will be described below with reference to FIG. 5.

In Step S112, the vehicle management server 400 detects initiation of the use of the vehicle 100 by means of the user terminal 200. For the above detection to be possible, the user terminal 200 may notify the vehicle management server 400 of the initiation of the use of the vehicle 100 when the use of the vehicle 100 is initiated by means of the electronic key data of the user terminal 200. Alternatively, the vehicle management server 400 may be notified of the vehicle 100 being operated by means of the electronic key data of the user terminal 200 when an operation of the vehicle 100 by means of the electronic key data of the user terminal 200 is detected. The vehicle management server 400 executes the processing of Step S114 and the following processing once the use of the vehicle 100 by means of the user terminal 200 is initiated.

In Step S114, the vehicle management server 400 identifies the user (user terminal 200) using the vehicle 100. By identifying the user using the vehicle 100, the vehicle management server 400 is capable of acquiring the use contract (available range information) for the vehicle 100 associated with the user.

In Step S116, the vehicle management server 400 acquires the position of the vehicle 100. As described above, the vehicle 100 transmits the positional information acquired from the GPS device 150 to the vehicle management server 400 on a regular basis via the wireless communication unit 160. Accordingly, the vehicle management server 400 is capable of tracking the position of the vehicle 100. The same effect can be obtained by the user terminal 200 transmitting positional information acquired from a GPS device of the user terminal 200 to the vehicle management server 400 instead of the vehicle 100 transmitting the positional information.

In Step S118, the determination unit 408 determines whether or not the position of the vehicle 100 is within the available range included in the lending terms. The determination unit 408 may determine whether or not the current position of the vehicle 100 is within the available range. Alternatively, the determination unit 408 may determine whether or not the position of the vehicle 100 will deviate from the available range in the future by predicting a future movement path of the vehicle 100. The processing proceeds to Step S120 in a case where the position of the vehicle 100 is out of the available range (or in a case where the position of the vehicle 100 is expected to deviate from the available range). Otherwise, the processing proceeds to Step S126.

In Step S120, the determination unit 408 determines whether or not a state where the vehicle 100 is out of the available range has continued for a predetermined time or more.

The processing proceeds to Step S124 when the vehicle 100 has remained out of the available range for less than the predetermined time, and then the notification unit 410 provides (transmits) a notification to the navigation device 155 of the vehicle 100 for a warning regarding the deviation from the available range. The warning may include additional charging being performed when the state where the vehicle 100 is out of the available range continues for the predetermined time or more.

The processing proceeds to Step S122 when the vehicle 100 has remained out of the available range for the predetermined time or more, and then the charging processing unit 412 performs an additional charging processing request with respect to the charging server 500. Then, in Step S124, the notification unit 410 notifies the navigation device of the vehicle 100 of the fact that the vehicle 100 is out of the available range and additional charging is performed.

In Step S124, the vehicle 100 outputs the content of the notification from the navigation device 155 upon receiving the notification from the vehicle management server 400. The notification in Step S124 may be performed with respect to the user terminal 200 from the vehicle management server 400 as well.

In Step S126, the vehicle management server 400 determines whether or not the use of the vehicle 100 by means of the user terminal 200 continues. In a case where the use continues, the processing returns to Step S116 and the monitoring processing for the vehicle 100 continues. In a case where the use is over, the vehicle management server 400 terminates the monitoring processing for the vehicle 100.

Figure 5:
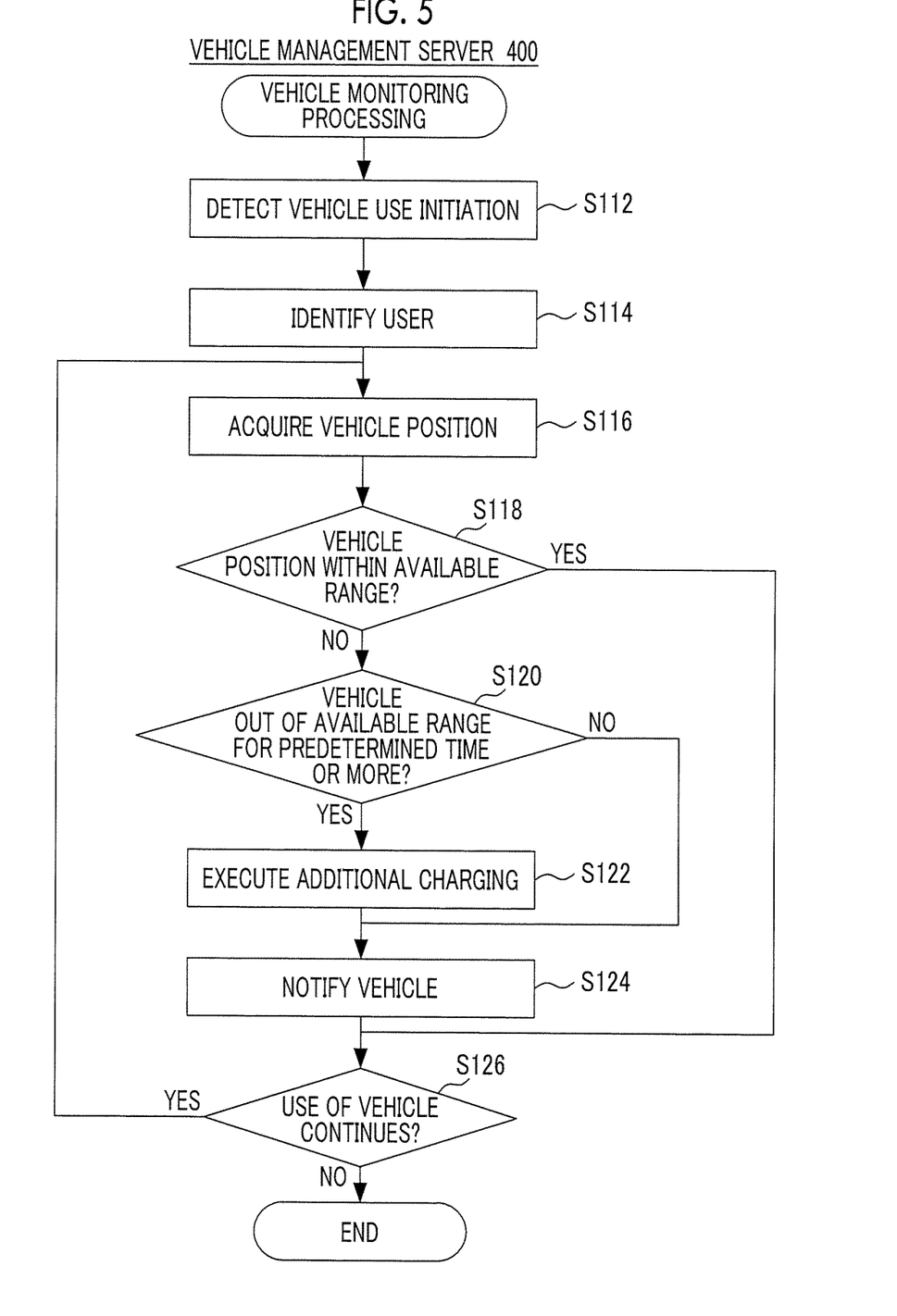
FIG. 5 is a flowchart illustrating the flow of vehicle monitoring processing executed by a vehicle management server according to the embodiment.

The processing flow illustrated in FIG. 5 is merely an example. In the first embodiment, the type of processing to be executed by the vehicle management server 400 depending on the position of the vehicle 100 may be appropriately determined in accordance with a system request. Conceivable examples are as follows.

(1) Merely a warning is given when the position of the vehicle 100 remains out of the available range for less than a predetermined time, and additional charging is performed when the position of the vehicle 100 remains out of the available range for the predetermined time or more.

(2) Merely a warning is given in a case where the position of the vehicle 100 is currently within the available range yet predicted to move out of available range in the future, and additional charging is performed after the position of the vehicle 100 moves out of the available range.

Figure 6:
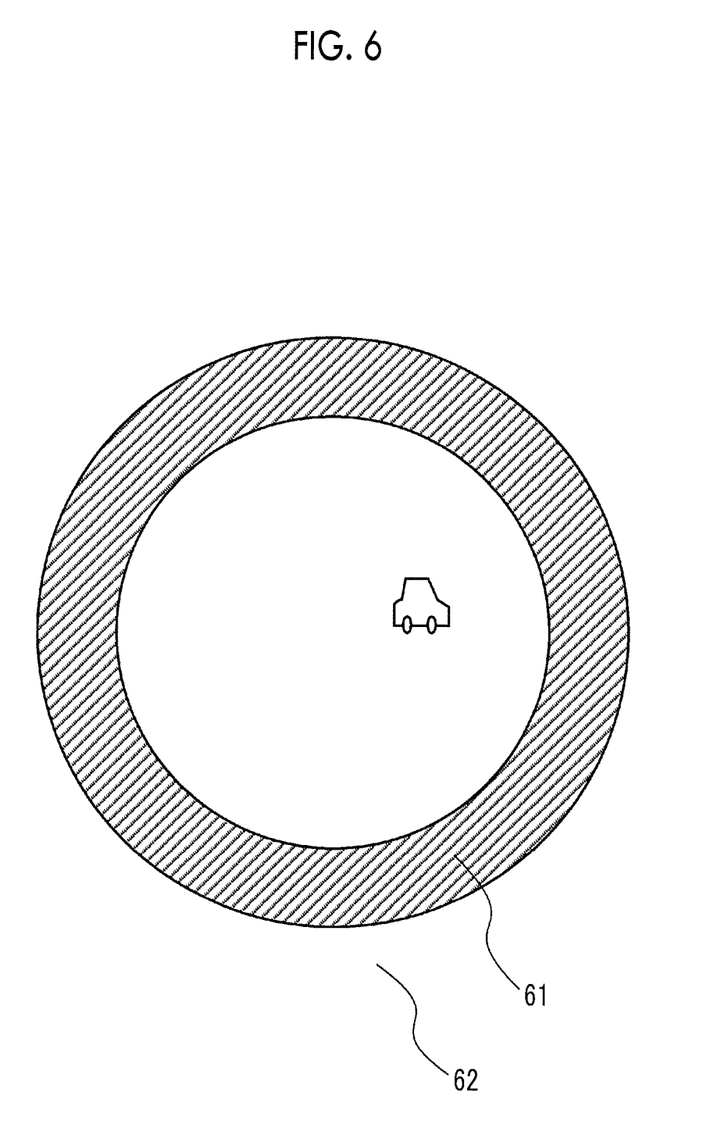
FIG. 6 is a diagram for describing a warning region and an additional charging region related to an available range.

(3) Merely a warning is given when the position of the vehicle 100 is within the available range and within a predetermined distance from the available range, and additional charging is performed when the position of the vehicle 100 is at a predetermined distance or more from the available range. As illustrated in FIG. 6, in this case, a warning region 61 (shaded part) and an additional charging region 62 (outside the warning region 61) are determined, merely the warning is given when the vehicle 100 is within the warning region 61, and the additional charging is performed when the vehicle 100 is in the additional charging region 62. The warning region 61 may be determined as the same region as the available range included in the terms of use and the additional charging region 62 may be determined as a region extended by a predetermined distance from the warning region 61 (available range). Alternatively, the additional charging region 62 may be determined as the same region as the available range included in the terms of use and the warning region may be determined as a region reduced by a predetermined distance from the additional charging region 62 (available range).

Advantageous Effect of First Embodiment

According to the first embodiment, in the vehicle lending system for lending the vehicle by issuing the electronic key data, a user is warned in a case where the vehicle 100 is out of the available range and the warning entails additional charging in some cases, and thus there is an incentive for the user to use the vehicle 100 within the available range. In other words, the available range (travelable range) of the vehicle can be limited. The available range is set as one of the terms for lending the vehicle 100 and can be individually set for each user. Accordingly, the available range can be flexibly set.

Second Embodiment

In the first embodiment, the available range is determined as a geographical region. A different determination is used in a second embodiment. Specifically, the available range according to the second embodiment is determined as a region where the vehicle 100 is arrivable at a predetermined point by a predetermined time. Here, the predetermined point and the predetermined time can be a return point (hereinafter, referred to as a "destination") and a return time (hereinafter, referred to as a "destination arrival time") in the use contract.

As described above, in the second embodiment, the available range varies with time. In Step S118 of the vehicle monitoring processing (flowchart in FIG. 5), the determination unit 408 of the vehicle management server 400 determines the available range as a range in which the destination can be arrived at by the destination arrival time and uses the available range for a determination. A real-time traffic situation (such as traffic jam information and an average movement speed) may be used for the range determination.

Figure 7:
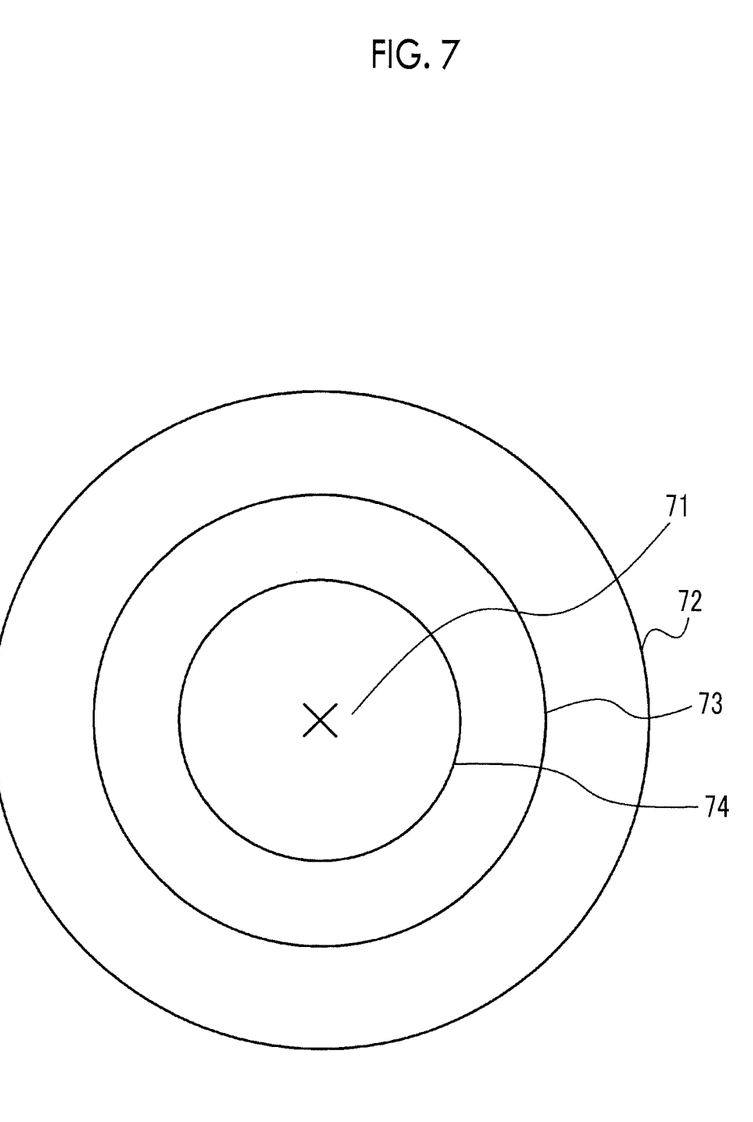
FIG. 7 is a diagram for describing processing in a case where the available range is changed with time.

FIG. 7 is a diagram for describing an example of the available range according to the second embodiment. Here, it is assumed that returning to a return position 71 by a predetermined time is stipulated in the use contract. Immediately after use initiation (before time $t_1$), the available range is a region 72. The available range is a region 73, which is narrower than the region 72, after time $t_1$ and before time $t_2$. After time $t_2$, the available range is a region 74, which is narrower than the region 73. Here, each available range is determined with the time range divided into three. The available range may also be determined with more divisions or in a continuous manner.

FIG. 7 is a schematic description, and it should be noted that FIG. 7 does not take traffic conditions into account, that is, FIG. 7 assumes that the vehicle 100 is capable of moving at a uniform speed. In reality, a position farther from the return position 71 is included in the available range when the vehicle 100 uses a traffic jam-free expressway than in a case where the vehicle 100 uses a general road. Accordingly, it is also assumed that the available range does not become a circle about the return position 71.

According to the second embodiment, the destination can be arrived at by the destination arrival time in a more reliable manner.

Third Embodiment

In a third embodiment, processing other than additional charging is executed when the vehicle 100 deviates from the available range. Specifically, in the third embodiment, an autonomously drivable vehicle may be adopted as the vehicle 100 and the vehicle management server 400 may request the vehicle 100 to move up to a predetermined position by autonomous driving in a case where the vehicle 100 is out of the available range. The predetermined position may be any position. A return point of the vehicle 100 can be adopted as an example of the predetermined position.

Although not particularly limited, also in the third embodiment, it is desirable that the autonomous driving is requested in a case where the vehicle 100 does not return to the available range despite a sufficient warning with respect to the user without the autonomous driving being requested immediately after the vehicle 100 deviates from the available range.

Modification Example

Although an example in which the vehicle management server 400 is implemented as one device has been described in the above embodiments, the function of the vehicle management server 400 may be realized by a plurality of devices as well. For example, the function of the vehicle management server 400 can be broadly divided into a function for concluding a vehicle use contract, a function for issuing an electronic key, and a function for monitoring a vehicle use range and giving a warning or the like as needed. Accordingly, the function of the vehicle management server 400 may be realized by individual server devices in charge of the three functions. However, the manner of the functional sharing is not limited to the above aspect and the functions may be shared in any other aspect.

In the above embodiments, the key unit 110 is interposed between the user device (user terminal 200) and the collation unit 130. Alternatively, the vehicle may be controlled by the user device directly and wirelessly communicating with the collation unit 130.

In the above embodiments, the electronic key is issued from the vehicle management server 400 to the user device (user terminal 200). This processing is optional. For example, key data (authentication information) may be pre-stored in the user device and a notification indicating that the vehicle 100 is available may be performed in a case where the key data (authentication information) of the user device is transmitted from the vehicle management server 400 to the vehicle 100. This processing corresponds to the vehicle lending processing according to the above embodiments.

Although the electronic key controls the vehicle in the above description, the control object of the electronic key may be any device that can be moved (carried) and can be controlled in terms of availability by the electronic key. Examples of such devices include robots, aircraft (including unmanned aerial vehicles), ships, and computers.

Although embodiments of the present disclosure have been described in detail above, the applicable embodiment of the present disclosure is not limited to the above-described embodiments, and various modifications or changes may be made within the scope of the gist of the present disclosure described in above.

What is claimed is:

1. A vehicle management system, comprising:
   a server configured to
     issue electronic key data of a vehicle with respect to a user device;
     acquire range information representing an available range of the electronic key data of the vehicle,
     acquire positional information of the vehicle,
     when the vehicle is used by using the electronic key data, determine whether or not a position of the vehicle is out of the available range or is expected to deviate from the available range,
     provide a notification to the user device in a case where the position of the vehicle is out of the available range or in a case where the position of the vehicle is expected to deviate from the available range, and
     acquire lending terms at a time the vehicle is lent to a user of the user device, the lending terms including the available range.

2. The vehicle management system according to claim 1, wherein:
   the server is configured to acquire the range information as a condition for issuing the electronic key data to the user device; and
   the server is configured to use, for the determination, the available range represented by the range information related to the user device.

3. The vehicle management system according to claim 1, wherein the server is configured to provide the notification to the user device.

4. The vehicle management system according to claim 1, wherein the server is configured to provide the notification to an in-vehicle terminal mounted in the vehicle.

5. The vehicle management system according to claim 1, wherein the notification is a notification for informing the user using the user device of charging to be performed.

6. The vehicle management system according to claim 1, wherein the notification is a notification for warning regarding the vehicle being out of the available range or being expected to deviate from the available range.

7. The vehicle management system according to claim 1, wherein:
   the vehicle is an autonomously drivable vehicle; and
   the server is configured to provide a notification for requesting a control device of the vehicle to move up to a predetermined position by autonomous driving.

8. The vehicle management system according to claim 1, wherein the server is configured to change the available range with time for use in the determination.

9. The vehicle management system according to claim 8, wherein:
   the range information further includes a destination and time of arrival at the destination; and
   the server is configured to change the available range as a range in which the vehicle is arrivable at the destination by the time of arrival.

10. A vehicle management method performed by a vehicle management system including a server, the vehicle management method comprising:
    issuing, by the server, electronic key data of a vehicle with respect to a user device;
    acquiring, by the server, range information representing an available range of the electronic key data of the vehicle;
    acquiring, by the server, positional information of the vehicle;
    when the vehicle is used by using the electronic key data, determining, by the server, whether or not a position of the vehicle is out of the available range or is expected to deviate from the available range;
    providing, by the server, a notification to a device related to the vehicle in a case where the position of the vehicle is out of the available range or in a case where the position of the vehicle is expected to deviate from the available range; and
    acquiring, by the sever, lending terms at a time the vehicle is lent to a user of the user device, the lending terms including the available range.

11. A non-transitory computer-readable recording medium storing a program for executing a vehicle management method performed by a vehicle management system with a computer, the vehicle management system including a server and the program executing a control process for the vehicle management system, the control process comprising:
    issuing, by the server, electronic key data of a vehicle with respect to a user device;
    acquiring, by the server, range information representing an available range of the electronic key data of the vehicle;
    acquiring, by the server, positional information of the vehicle;
    when the vehicle is used by using the electronic key data, determining, by the server, whether or not a position of the vehicle is out of the available range or is expected to deviate from the available range;
    providing, by the server, a notification to a device related to the vehicle in a case where the position of the vehicle is out of the available range or in a case where the position of the vehicle is expected to deviate from the available range; and
    acquiring, by the sever, lending terms at a time the vehicle is lent to a user of the user device, the lending terms including the available range.

12. The vehicle management system according to claim 1, wherein the available range is a region within a predetermined distance from a predetermined point.

* * * * *